(12) United States Patent
Zhang et al.

(10) Patent No.: US 9,685,181 B2
(45) Date of Patent: Jun. 20, 2017

(54) METHOD OF OPERATING A DATA STORAGE APPARATUS AND DATA STORAGE APPARATUS

(71) Applicant: MARVELL INTERNATIONAL LTD., Hamilton (BM)

(72) Inventors: Jingliang Zhang, Singapore (SG); Anmin Kong, Singapore (SG); Songhua Zhang, Singapore (SG); Zhimin Yuan, Singapore (SG)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/914,813

(22) PCT Filed: Sep. 2, 2014

(86) PCT No.: PCT/SG2014/000415
§ 371 (c)(1),
(2) Date: Feb. 26, 2016

(87) PCT Pub. No.: WO2015/030684
PCT Pub. Date: Mar. 5, 2015

(65) Prior Publication Data
US 2016/0210992 A1    Jul. 21, 2016

(30) Foreign Application Priority Data

Sep. 2, 2013  (SG) .................................. 201306591

(51) Int. Cl.
*G11B 5/596*    (2006.01)
*G11B 20/10*    (2006.01)

(52) U.S. Cl.
CPC .... *G11B 5/59627* (2013.01); *G11B 20/10046* (2013.01)

(58) Field of Classification Search
None
See application file for complete search history.

(56) References Cited

U.S. PATENT DOCUMENTS 4,313,140 A * 1/1982 Keidl ....................... G11B 5/02
                                                        360/131
4,652,945 A * 3/1987 Marchant ................. G11B 5/00
                                                        360/131

(Continued)

FOREIGN PATENT DOCUMENTS

EP        0030256 B1    2/1984
WO    WO-2013/077811 A1    5/2013

OTHER PUBLICATIONS

International Search Report regarding Application No. PCT/SG2014/000415, mailed Nov. 5, 2014.

(Continued)

*Primary Examiner* — K. Wong

(57) ABSTRACT

In the present disclosure, a method of operating a data storage apparatus is provided. The method includes writing a data signal into a portion of a data layer in a recording medium of a data storage apparatus. The method further includes determining a data layer coupling interference value arising due to interference from the data layer provided in between a sensor head and a servo layer of the recording medium in reading servo data, the data layer coupling interference value determined based on the data signal. The method further includes writing the data layer coupling interference value onto the recording medium. A corresponding data storage apparatus is provided.

25 Claims, 6 Drawing Sheets

(56) References Cited

U.S. PATENT DOCUMENTS

| | | | | |
|---|---|---|---|---|
| 5,070,421 A | * | 12/1991 | Sumiya | G11B 5/59688 360/77.07 |
| 5,305,157 A | * | 4/1994 | Wada | G11B 19/02 360/53 |
| 5,319,502 A | * | 6/1994 | Feig | G11B 5/58 360/29 |
| 5,568,331 A | * | 10/1996 | Akagi | G11B 5/59688 360/135 |
| 7,639,448 B2 | | 12/2009 | Haustein et al. | |
| 9,177,598 B2 | * | 11/2015 | Leong | G11B 21/02 |
| 2010/0177431 A1 | * | 7/2010 | Higashino | G11B 5/59633 360/75 |

OTHER PUBLICATIONS

Written Opinion regarding Application No. PCT/SG2014/000415, mailed Nov. 5, 2014.

* cited by examiner

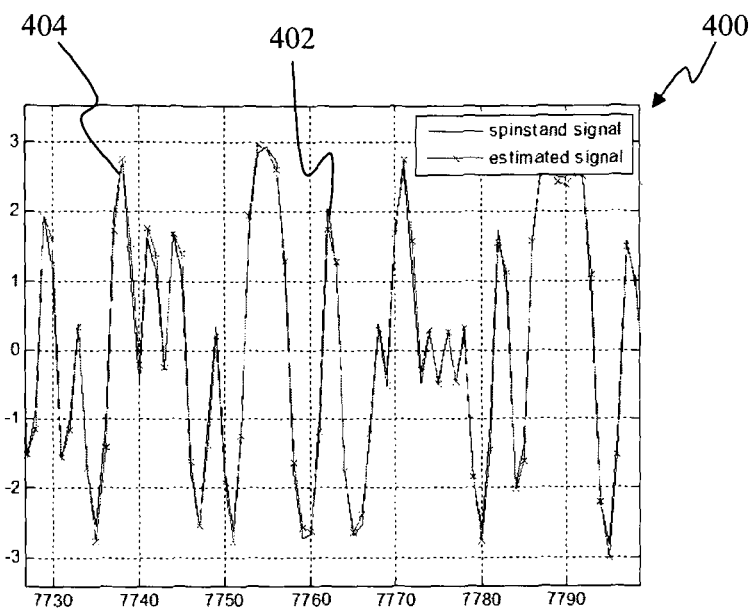
FIG. 4
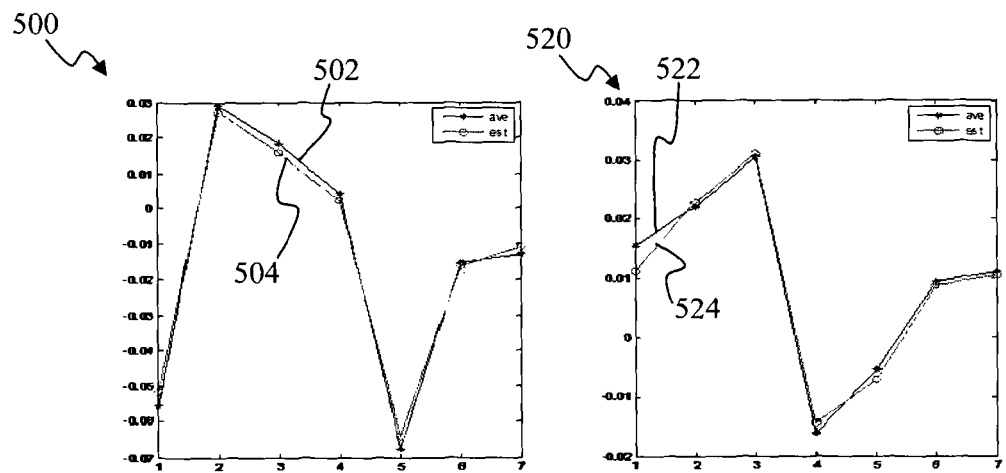
FIG. 5A  FIG. 5B

METHOD OF OPERATING A DATA STORAGE APPARATUS AND DATA STORAGE APPARATUS

CROSS-REFERENCE TO RELATED APPLICATIONS

This application is a U.S. National Phase Application under 35 U.S.C. 371of International Application No. PCT/SG2014/000415, filed 02 Sep.2014 and published in English as WO 2015/030684 A1 on 05 Mar. 2015, which claims the benefit of and priority to Singapore Patent Application no. 201306591-7, filed on 02Sep. 2013,the contents of both of the above priority applications are hereby incorporated by reference in their entirety for all purposes.

TECHNICAL FIELD

The present disclosure describes embodiments generally related to a method of operating a data storage apparatus. Further, a data storage apparatus is provided.

BACKGROUND

A hard disk drive (HDD) is a data storage device used for storing and retrieving digital information using rapidly rotating discs coated with magnetic material. A typical HDD includes one or more rigid rapidly rotating disks with magnetic heads arranged on a moving actuator arm to read and write data onto the disk surfaces. The disks are placed about a spindle, and are spun rapidly about the spindle as information is written to and read from the disk surface as it rotates past magnetic read-and-write head or heads that operate closely over the magnetic surface. The read-and-write head is used to detect and modify the magnetization of the material under it. The actuator arm is also known as a slider, as it floats or slides over the surface of the disk, carrying the head at a correct distance from the recording medium for reading and writing. As such, the read-and-write head can also be known as a slider head.

In order to accurately control the read-and-write (or read/write) head, a servo system is provided for control of the HDD, which can be for generating position feedback signals. HDD servo systems typically involve three kinds of control tasks: track-seeking control, track-following control, and setting control. In track-seeking control, the head positioning servomechanism moves the read/write head as fast as possible from one track to another. Once the head reaches the target track, it is regulated over the track so that the head can follow the track as precisely as possible during the operation of reading or writing data, in track-following control. In settling control, the servo provides for smooth settling, i.e. transition between the track-seeking and track-following modes without any impact.

In a conventional dedicated servo system, servo information is provided on a layer distinct from the data recording layer. Typically, the servo layer is provided on a separate layer from a disk including a data recording layer. In an embedded servo system, servo information is interspersed with data across the entire surface of all of the hard disk platter surfaces. The servo information and data are read by the same read/write heads, where the heads do not need to wait for the disk to rotate the servo information into place.

Recent developments have also introduced a buried dedicated servo system where servo information is provided on a layer distinct from the data recording later. Additionally, a servo recording layer is provided as a layer secondary to the data recording layer, and where both servo layer and data recording layer are provided on a single disk. Typically, the servo later is provided below the data layer on the disk. The servo layer includes a servo pattern which can be used in position error signal (PES) demodulation, which provides position error feedback to the servo control system to position the read/write head in moving across the surface of a rotating disk.

Buried servo systems can provide continuous PES analysis and thus can improve servo performance in HDD operations. However, the quality of the determined PES may be degraded due to the coupling of data signals to the servo channel. Simulation carried out by the present applicant shows that the coupling can contribute to the repeatable run out (RRO) component (harmonics of the frequency of spindle speed) in the PES demodulation noise.

As such, although a buried dedicated servo system supports high track density in the development of present day HDD technology, a concern is raised where data layer coupling interference may cause irregularities in the identification of the read/write head positioning.

SUMMARY

According to an embodiment, there is provided a method of operating a data storage apparatus, the data storage apparatus including a sensor head and a recording medium including a data layer and a servo layer provided under the data layer, the method comprising: writing a data signal into a portion of the data layer; determining a data layer coupling interference value arising due to interference from the data layer provided in between the sensor head and the servo layer in reading servo data, the data layer coupling interference value determined based on the data signal; and writing the data layer coupling interference value onto the recording medium.

According to an embodiment, there is provided a data storage apparatus, including: a recording medium including: a data layer; and a servo layer provided under the data layer; a sensor head for interacting with the recording medium; and a controller configured to send and receive signals with the sensor head in carrying out any one of a read operation or a write operation with the sensor head and the recording medium, the controller including: a write control module configured to provide signals to the sensor head to write a data signal into a portion of the data layer; an interference estimation module configured to determine a data layer coupling interference value based on the data signal and a data layer coupling response; and an interference writing module configured to provide signals to the sensor head to write the data layer coupling interference value onto the recording medium.

BRIEF DESCRIPTION OF THE DRAWINGS

In the drawings, like reference characters generally refer to the same parts throughout the different views. The drawings are not necessarily to scale, with emphasis instead generally being placed upon illustrating the principles of the present disclosure. It is to be noted that the accompanying drawings illustrate only examples of embodiments of this disclosure and are therefore not to be considered limiting of its scope, for the disclosure may admit to other equally effective embodiments. In the following description, various embodiments of the disclosure are described with reference to the following drawings, in which:

FIG. 4 illustrates an experimentally obtained comparison between a HDD signal and a compensated signal.

FIG. 5A and FIG. 5B illustrate a comparison for interference components according to an embodiment.

DETAILED DESCRIPTION

Figure 1A:
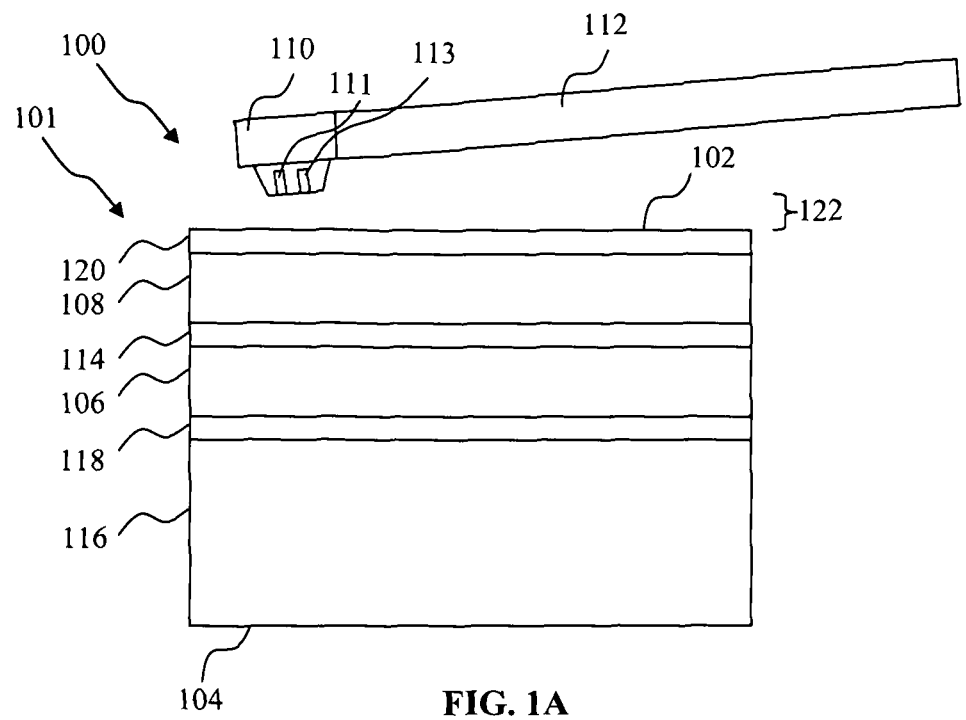
FIG. 1A illustrates a cross-sectional side view of a portion of a data storage apparatus according to an embodiment.

Embodiments of a recording medium and a method of recording on the recording medium are described in detail below with reference to the accompanying figures. However, it should be understood that the disclosure is not limited to specific described embodiments. It will be appreciated that the embodiments described below can be modified in various aspects, features, and elements, without changing the essence of the disclosure. Further, any reference to various embodiments shall not be construed as a generalization of any inventive subject matter disclosed herein and shall not be considered to be an element or limitation of the appended claims except where explicitly recited in a claim(s).

According to various embodiments, depiction of a given element or consideration or use of a particular element number in a particular FIG. or a reference thereto in corresponding descriptive material can encompass the same, an equivalent, or an analogous element or element number identified in another FIG. or descriptive material associated therewith. The use of "/" herein means "and/or" unless specifically indicated otherwise.

The present disclosure can describe embodiments of a consumer electronic device which can be operable in various orientations, and it thus should be understood that any of the terms "top", "bottom", "base", "down", "sideways", "downwards" etc., when used in the following description are used for convenience and to aid understanding of relative positions or directions, and not intended to limit the orientation of the recording medium or a system or apparatus or product incorporating the recording medium.

A computing system or a controller or a microcontroller or any other system providing a processing capability can be presented according to various embodiments in the present disclosure. Such a system can be taken to include a processor. The data storage apparatus may include a memory which is for example used in the processing carried out by the data storage apparatus. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In various embodiments, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with various alternative embodiments. Similarly, a "module" is thusly defined as a portion of a system according to the present disclosure and may encompass a "circuit" as above, or may be understood to be any kind of a logic-implementing entity therefrom.

In an embodiment, a hard disk drive (HDD) 100 is provided with a buried dedicated servo system, where servo information is provided on a layer distinct from a layer for recording data. Additionally, a servo recording layer is provided as a layer secondary to the data recording layer. Both the servo recording layer and the data recording layer are provided on a same or singular storage medium, and in the case of the present HDD application, a storage disk. In an embodiment, a plurality of disks or platters are provided in the hard disk drive, rotatably mounted about a spindle rotated by a spindle motor. Multiple read/write heads are provided, one for each disk, for carrying out a read function or a write function on the disk. In other embodiments, multiple heads are provided for carrying out a read function or a write function on a single disk.

In an embodiment, each disk in a plurality of disks mounted on a spindle is provided with a buried dedicated servo system. In other embodiments, only a single disk is provided with the buried dedicated servo system, while other disks mounted on the spindle are dedicated for data recording. In yet other embodiments, any number of disks are provided with the buried dedicated servo system, depending on the need for a constant access to positioning information. The buried dedicated servo can provide higher positioning accuracy through continuous or continual location determination, and in relieving servo information on servo sectors and tracks from the data recording layer, thereby also dedicates storage space in the recording layer for data recording. The dedicated servo system also increases the data recording density by increasing the track positioning accuracy.

According to an embodiment, during HDD operation, shingled writing may be employed to record small bits with overlap in the layout of data tracks. In shingled writing, the read/write head or recording head moves in a down-track direction along a particular track as data is written in blocks or shingles, and in successive scans move across the disk in a cross-track direction across adjacent tracks. Writing a shingle or shingles of data to the tracks of the disk is carried out by the magnetic flux of a recording head. As shingles are written, writing on a current track may overwrite a portion of the previous track resulting in a narrower track pitch.

In an embodiment, a head-positioning servomechanism is provided in the HDD 100 to act as part of a control system. The control system may position the head which is mounted on an actuator over a desired data track of a storage medium and reposition the read/write head from one data track to another.

FIG. 1A illustrates a cross-sectional side view of a data storage apparatus according to an embodiment. The data storage apparatus 100 can include a recording medium 101. In an embodiment, recording medium 101 is in the shape of a circular disk and is also referred to in the present disclosure as a disk. The disk 100 includes a first surface 102, also known as a top surface, and a second bottom surface 104 parallel to and oppositely facing from the first surface 102.

In an embodiment, the recording medium 101 can be a magnetic medium. Within the recording medium 101 includes a first layer 106 and a second layer 108 which can be a magnetic layer, or particularly a ferromagnetic layer, and can be magnetically manipulated by way of a read/write head or a sensor head 110, which is coupled to an actuator arm 112 for operating the read/write head 110. In an embodiment, the read/write head is a sensor head, including a sensor for magnetically manipulating a magnetic layer in the recording medium. In an embodiment, the sensor head includes a sensor for reading and/or writing on the magnetic layer. In an embodiment, the sensor head is a sensor for reading and/or writing on the magnetic layer.

According to an embodiment, a magnetic recording medium including a first layer and a second layer is provided to store information. One of the layers is stacked on top of the other layer. In an embodiment, the second layer 108 is stacked on top of the first layer 106. The first layer 106 is arranged to receive a portion of servo information and can be known as a servo layer. The second layer 108 is arranged to receive a portion of user data and can be known as a data recording layer. In the present disclosure, references to "data" typically refer to "user data", unless otherwise made clear by the context. The second layer 108 can also be further configured to record addressing information of servo information. The location of such addressing information can be referred to as a servo wedge.

In an embodiment, the servo layer 106 can be separated from the data recording layer 108 by a first intermediate layer 114. Further, a soft under layer (SUL) 116, including a soft magnetic material, and having a high permeability is provided. There are certain advantages of providing the SUL 116 in the recording medium—the SUL 116 causes the flux from the read/write head 110 to be substantially perpendicular to the media plane; the SUL 116 increases a readback signal amplitude; and the SUL 116 provides an easy, low reluctance path for returning the flux to the return read/write pole on the read/write head 110. A second intermediate layer 118 can also be provided in between the servo layer 106 and the SUL 116.

In an embodiment, an overcoat 120 is provided over the data recording layer 108. The overcoat 120 forms the top surface 102 of the recording medium 101. In an embodiment, the overcoat 120 is a diamond-like carbon (DLC) overcoat. Further, a lubricant film surface can be provided over the overcoat 120. In order to support high density read/write functions, the magnetic spacing 122 between the read/write head 110 and the data recording layer should be as small as possible.

In other embodiments, other layers may be introduced into the recording medium 101, or various described layers which may be deemed as non-essential may be removed. Further the layers of the recording medium may be provided in any order, not necessarily being limited by that as described in embodiments above or illustrated in the figures. In the present disclosure, focus will be paid on the servo layer and the data recording layer in interaction with the read/write head of the HDD 100.

Figure 1B:
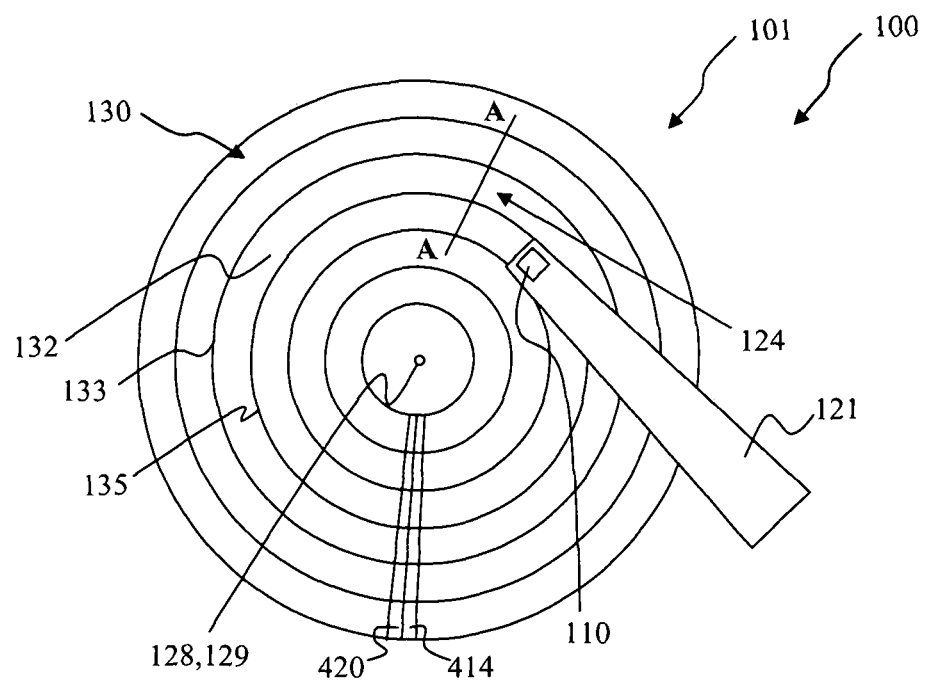
FIG. 1B illustrates a top-down schematic representation of the data storage apparatus of FIG. 1A.

FIG. 1B illustrates a top-down schematic representation of the data storage apparatus of FIG. 1A. Recording medium 101 includes a plurality of tracks. Particularly, a plurality of continuous annular tracks 130 are provided on recording medium 101, which run parallel to the circumference of the circular recording medium 101. Each annular track can be understood to have or be bounded by an interior perimeter, proximal or closer to the center of the disk, and an exterior perimeter, proximal or closer to the circumference of the disk. The plurality of annular tracks has a common center 128 at a central axis 129 of the disk, which runs perpendicularly through the disk, and forms a rotational axis of the disk. In operation, the recording medium is rotated about the central rotational axis 129.

From a top-down perspective, the tracks 130 observed are provided as part of the data recording layer 108. Tracks 130 can also be referred to as data tracks 130. Data track 132 is shown to have an exterior perimeter 133 and an interior perimeter 135. In an embodiment, similar continuous annular servo tracks are provided in the lower servo layer 106, which run parallel to each other and to the circumference of the circular recording medium 101. The plurality of servo tracks similarly have the same center 128 and rotate as part of the servo layer 106 about the same central rotational axis 129.

According to an embodiment, the servo layer 106 can be a buried layer arranged beneath the data recording layer 108. In the context of various embodiments, the servo layer 106 and the data recording layer 108 are separate layers or distinct layers where the signals from the servo layer 108 and the data layer 108 can be read together at the same time. The servo layer 106 has a perpendicular or a longitudinal magnetization orientation for providing magnetic information for determining the location of the read/write head 110 in relation to the storage medium 100. The servo information is provided on the servo layer 106 distinct from the data recording layer 108 so as to allow continuously available servo readback to enable continuous or continual position feedback, thereby providing continuous or continual location detection without utilizing any of the recording layer 108 for location detection.

Actuator arm 112 is arranged to actuate and manipulate the read/write head 110 on or over different data tracks 130 on data recording layer 108. The actuator arm 112 can be a flexure arm providing maneuverability in positioning the read/write head 110. The read/write head 110 can be configured to carry out a read operation in reading data bits written on a data track or a write operation in writing data signals as data bits on a data track.

Figure 1C:
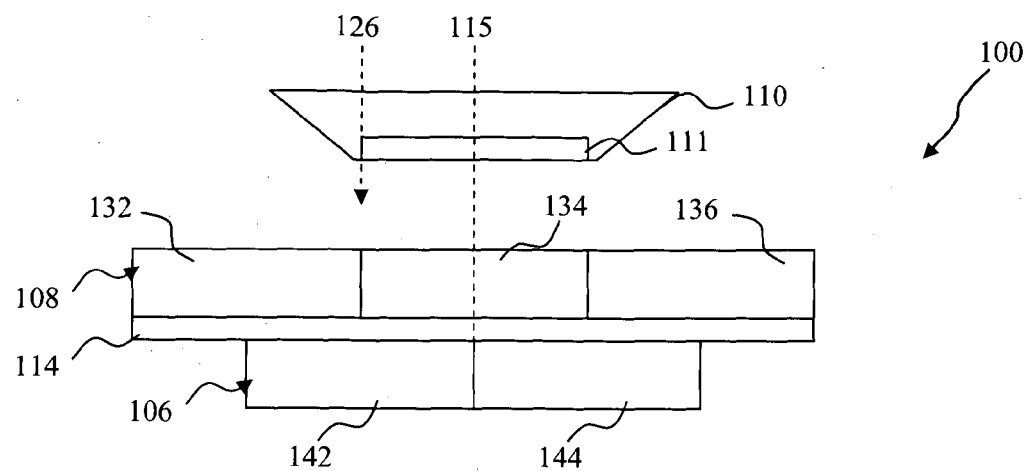
FIG. 1C illustrates a cross-sectional side view of a portion of the data storage apparatus of FIG. 1B.

FIG. 1C illustrates a cross-sectional side view of a portion of the data storage appartus of FIG. 1B. FIG. 1C can correspond to a view across line A-A from a direction indicated by arrow 124 in FIG. 1B. A plurality of data tracks 132, 134, 136 are provided in data recording layer 108, configured to at least record data. Further, servo tracks 142 and 144 are provided in servo layer 106, configured to at least record servo bursts. In an embodiment, intermediate layer 114 is provided between the servo layer 106 and the data recording layer 108. Further, read/write head 110 is illustratively indicated in FIG. 1C.

Figure 1D:
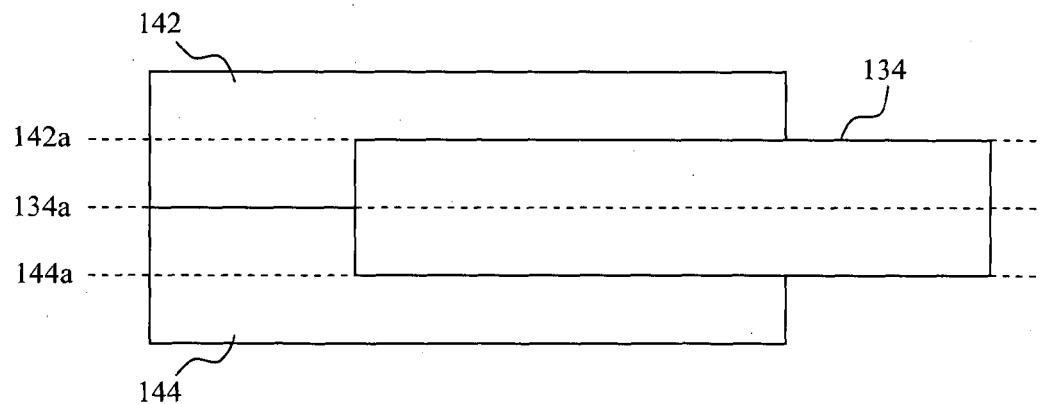
FIG. 1D illustrates a top-down view of a schematic of a data track and two servo tracks and according to various embodiments.

FIG. 1D illustrates a top-down view of a schematic of a data track 134 and two servo tracks 142 and 144 according to various embodiments. FIG. 1D can correspond to the view indicated by arrow 126 in FIG. 1C. Data track 134, as part of data recording layer 108, is provided over a first servo track 142 and a second servo track 144, as part of servo layer 106.

In an embodiment, first servo track 142 includes a track width or a track pitch. Correspondingly, second servo track 144 also includes a track width, which is substantially equal to the track width of first servo track 142. Further, in an embodiment, data track 134 includes a track width which is substantially equal to the track width of servo tracks 142 and 144. In fact, in various embodiments, the track width of each track in the recording medium 101, including each servo track and each data track, is substantially equal to one another. In various embodiments, the data tracks and the servo tracks are not equal or substantially equal in track widths.

In an embodiment, the data track 134 can be arranged from the first servo track 142 by half a track width. In other words, the data track 134 can be arranged from the first servo track 142 such that the projection of the data track 134 on a plane parallel to the top surface 102 of the recording medium 101 can be half a track width from the projection of the first servo track 142 on such a same plane. Further, the data track 134 can also be arranged from the second servo track 142 by half a track width.

According to an embodiment, the data track 134 can be between the first servo track 142 and the second servo track 144. "Between" may mean that the projection of a center line 134a of the data track 134 on a plane parallel to the top surface 102 of the recording medium is between the projection of a center line 142a of the first servo track 142 on the plane and the projection of a center line 144a of the second servo track 144 on the plane. The center line of a track runs along the track.

In an embodiment, the data track 134 is provided corresponding to the first servo track 142 and the second servo track 144. By "corresponding", it is understood that the first servo track 142 and the second servo track 144 can store servo information relating to information being written on data track 134. It can also be understood that the first servo track 142 and the second servo track 144, or the magnetic properties of the written first servo track 142 and the second servo track 144, can be used to extract a signal for determining position of a read/write head in carrying out a read or write function on the data track 134. In various embodiments, the data track 134 is provided can be equidistant between the first servo track 142 and the second servo track 144 when the tracks are projected on a similar plane parallel to the top surface 102. In such a case, as each of the data track 134, the first servo track 142 and the second servo track 144 are of a track width size, the sides of the data track 142 intersect with the center lines 142a and 144a of the first servo track 142 and the second servo track 144, and the center line 134a of data track 134 intersects with where the first servo track 142 physically meets the second servo track 144. In other words, data track 134 can be arranged by half a track width from both the first servo track 142 and the second servo track 144. Additionally, the data track 134 can be arranged from the first servo track 142 such that a projection of the data track 134 on a plane parallel to the top surface 102 of the recording medium 101 (or the bottom surface 104 of the recording medium) can be half a track width from the projection of the data track 134 on such a plane.

In various embodiments, the recording medium 101, including the data tracks 130 of the data recording layer 108, may be divided into various data sectors with addressing information interspersed between the data sectors. The addressing information can include automatic gain control (AGC). Additionally, addressing information can include sector address mark (SAM). Addressing information can also include GrayCode. In various embodiments, within the addressing information, the AGC can occupy 80 bits, the SAM can occupy 12 bits and the GrayCode can occupy 24 bits. The addressing information can be considered servo information, and can be recorded on the data layer 108.

According to various embodiments, the automatic gain control (AGC) can also be used to establish a feedback clock signal for synchronization of media read and write operations to minimize the effect of spindle speed fluctuation. The AGC can also be used to normalize the amplitude of read-back signal for a gray code detector and SAM detector. The SAM can provide the down-track information which tells the number of servo sectors that read head has crossed. The GrayCode can indicate the servo track number (track address) that the read/write head 110 is following. All servo sectors on a servo track have the same servo track number encoded.

According to an embodiment, read/write head 110, supported by an actuator arm 112 or a flexure, is provided for reading and/or writing data onto a data recording layer 108, additionally, onto a portion or a segment of a data recording track 134 in the data recording layer 108. The read/write head 110 is of course able to read and/or write data on any portion or segment of any data recording track in the data recording layer 108. Further, the read/write head 110 is further able to read information on any portion or segment of a servo track in a servo layer 106 in the recording medium 101. In an embodiment, the read/write head 110 is configured to read and or write data on a continuous annular data recording track 134, the read/write head 110 tracking or tracing the data recording track 134 through one or a multiple of revolutions of the rotating recording medium 101, until a read or write task or function is completed by the read/write head 110 on the data recording track 134.

In an embodiment, the read/write head 110 is a magnetoresistive head with independent read and write elements. In an embodiment, an inductive element 111 is provided for write operations and a magnetoresistive element 113 is provided for read operations. Other read/write head configurations with various individual or combined heads are also possible, according to the present disclosure.

In carrying out the read or write task on the data recording track 134, the read/write head 110 is aligned to the data recording track 134. Additionally, a center line 115 of the read/write head 110 is aligned to the center line 134a of the data recording track 134 during a read or write task carried out by the read/write head 110.

Alignment of the center line 115 of the read/write head 110 to the center line 134a of the data recording is important, such as to obtain a maximum magnetic signal from the data recording track for the read or write task. Further, certain physical limitations as well as deviations give rise to position error or track misregistration (TMR). Certain factors contributing to TMR can be repeatable runout (RRO) and non-repeatable runout (RRO). In RRO, the error is "phase locked", that is, the head is off-track by the same amount at the same point on the disk, i.e. for each revolution. Factors contributing to RRO can include, but are not limited to, disk eccentricity, where data recording tracks and servo tracks are not perfectly geometrically annular, and perhaps errors in servo track writings. Factors contributing to NRRO can include, but are not limited to, bearing defects, noise, spindle motor imperfections, platter vibrations, air fluctuations, and servo loop response errors.

In view of TMR, it is necessary for the read/write head 110 to constantly laterally adjust, i.e. move left and right, in order to stay in the middle of the track or be aligned to the central line 134a of the data recording track 134 during a read or write task carried out by the read/write head 110. To facilitate such adjustment, a control system of the hard disk drive generates a position error signal (PES) which identifies how far off-track or misaligned the read/write head is at a specific point of time.

Generally the read/write head senses the servo patterns on the servo layer to produce a servo signal, which is also referred to as a read back signal. Position signals can be derived from the read back signal for aligning the head to the recording medium. PES is a signal proportional to the relative difference of the positions of the center of the read/write head and the nearest track center. The position error signal contains two sources of motion: motion of the actuator and; motion of the disk surface itself. The pattern used on the servo surface is designed in concert with a demodulation scheme, such that when read back, the signals infer head position relative to the nearest track center. Generally, the PES is generated with regard to the servo system, derived from servo bursts in the operation of the disk drive.

Different servo patterns can be used to generate the continuous PES. In an embodiment, a dual frequency servo system is provided, where a single tone servo signal, which can be a servo pattern in a first frequency (f1), is written on first servo track 142 and another single tone servo signal, which can be a servo pattern of a second frequency (f2), is written on second servo track 144.

In such a case, the servo burst patterns provide dual frequency signals to a read head. A PES is generated from finding a difference in signal amplitude between f1 and f2, as part of a demodulation of read back signals. When a read head is positioned over the entire width of a data recording track, the PES may be at a minimum. The read head is ideally positioned over a center line of the data recording track during reading for good track following.

It is noted that the interference cancellation scheme according to the present disclosure is not tied to a particular servo scheme. According to embodiments, any servo scheme can be used, where the PES signal can be digitally demodulated. In embodiments, the servo scheme used in the buried servo system can be any one of a single frequency quadric pattern, a differential servo pattern, a dual frequency servo pattern, a triple frequency servo pattern, or a DC servo pattern. For each servo pattern, a different read back signal transfer function equation can be provided, but for each equation, a data coupling interference can be separately determined.

As mentioned, recording medium 101 is a magnetic medium, which allows storage of data as tiny areas of either positive or negative magnetization on layers of the medium 100. Each tiny area represents a "bit" of information. In each layer, the bits are written closely-spaced to form circular tracks. A plurality of annular tracks is provided in each layer. In an embodiment, there are millions of bits on each track and many tens of thousands of tracks on each disk surface.

According to an embodiment, perpendicular recording is used in forming and operating the recording medium 101. In perpendicular recording, the "magnetic bits" point up or down perpendicular to the disk surface. Further, in bit patterning, magnetic cells are provided and magnetized, each cell storing or including one bit per cell, which allows much higher areal density as well as thermal stability.

According to various embodiments, in operation, the read/write head 110 is configured to carry out a read function to verify head location, prior to carrying out any one of a read function from a data layer or a write function on a data layer. The head 110 is configured to obtain a read back signal from the recording medium 101 prior to the carrying out of a read function or write function on the data layer. A PES is then determined from the read back signal, to ascertain the positioning of the read/write head 110 and to correct the position if necessary.

According to embodiments, a servo positioning module in the HDD 100 can carry out a PES determination to identify the PES from the read back signal. According to an embodiment, a dual frequency servo system is utilized in the HDD. As mentioned above, a single tone servo signal f1 can written at one track 142 and another single tone signal f2 can be written at an adjacent track 144. The signal amplitude of f1 and f2 can be estimated as a and b, respectively. The ratio of (a−b)/(a+b) can then be used as the positioning error signal (PES) for the servo to reflect the offset between head 110 and track center 115 of the relevant data recording track 134. In other embodiments, the determination of the PES can be different where different servo systems are used.

Figure 2:
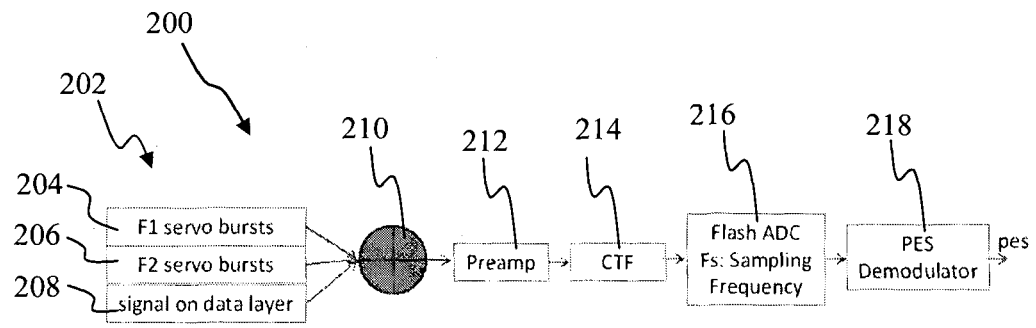
FIG. 2 illustrates a block schematic of a method for determining an error signal in operating the data storage apparatus, according to an embodiment.

FIG. 2 illustrates a block schematic of a method 200 for determining an error signal in operating the data storage apparatus, according to an embodiment. Such a determination can be carried out in a control module of the HDD 100. In embodiments, such a determination is carried out in a control module of the servo positioning module. Method 200 can be known as a PES demodulation process. In the present embodiment, the PES demodulation process is applied to where the servo system is a dual frequency servo system. In other embodiments where different servo systems are used, modifications can be included in the PES demodulation process to achieve the desired results. Alternatively, a different PES demodulation process is provided to achieve the desired results.

In the method 200, a read back signal 202 is obtained and provided to a summing block 210. The read back signal 202 can include response from first servo bursts 204 from the first servo track and response second servo bursts 206 from the second servo track. In an embodiment, the servo system is a dual frequency servo pattern, and the response from first servo bursts 204 include a servo response from the first servo track in a first frequency and the response from second servo bursts 206 include a servo response from the second servo track in a second frequency.

Further, the read back signal 202 can further include a response from data signals 208 written on or in the data layer of the recording medium. Such a response 208 is unintended for, but nonetheless received, as the read/write head 110 travels across the recording medium 101. As mentioned above, interference due to the response 208 can cause an incorrect read/write head position to be determined from the response from first servo bursts 204 and the response from second servo bursts 206.

The summing block 210 receives the read back signal 202 and provides a single output signal for processing at a preamplifier 212. The preamplifier 212 can be electrically coupled to the read/write head 110. In embodiments, the preamplifier 212 can be a semiconductor chip configured to control a read/write head and corresponding read and write elements, and amplifies signals from/to them.

The preamplifier 212 thereafter provides the amplified signal to a continuous time filter (CTF) module 214. The CTF module 214 can be a signal processing filter which is configured to suppress and/or accentuate various aspects of a signal received at the module 214. The CTF module 214 can include any one of a digital filter, an analog filter or an electronic filter. The CTF module 214 can include a band-pass filter or a low-pass filter, and can be configured to filter out the interference in the signal from the data layer, such that the interference is greatly reduced during the PES calculation.

The CTF module then provides the processed signal to a Flash ADC (please define) module 216 which is configured to carry out a sampling process about a sampling frequency at a high sampling rate on the signal. The Flash ADC module 216 can include an analog to digital signal converter. Such a converter can be configured to convert the analog read back signal into a digital signal, which thereafter allows the utilization of advance signal processing algorithm. Such advanced signal processing algorithms can be used to process the digital signal in order to obtain and calculate a more accurate PES signal. The sampling rate, which can be understood to be the number of digital samples per second, and the resolution of the analog to digital converter, which can be understood to be a bit length of the converter, can be selected based on the servo signal format.

The processed signal from the ADC is then received at a PES demodulator 218 which can be configured to demodulate and obtain a PES signal. The PES demodulator 218 can include two parts—firstly a signal amplitude module configured to estimate the amplitude of the servo signals f1 and f2, in the case where a dual frequency servo system is used. Secondly the PES demodulator 218 can include a PES signal estimator, configured to estimate the PES signal according to equation $$PES = \frac{a-b}{a+b}.$$

In embodiments, such a method can be easily implemented in normal operation of the data storage apparatus. A data storage apparatus channel integrated circuit (IC), which can be a semiconductor-based microprocesssing module, can be configured to operate various data storage as well as servo position functions. Various individual processes carried out in PES demodulation, for example, continuous time filtering and analog to digital signal conversion, can be considered standard procedures handled as part of current servo operations and are part of the channel IC's functions. Introduction of the method of the present disclosure would introduce additional functionality. Nonetheless, any additional data processing load introduced by the method of the present disclosure can be considered minimal.

As noted above, a dual frequency servo system is utilized. It can be noted that the read back signal 202 obtained from such a dual frequency servo system can include not only the servo signals 204 and 206, but also interference from the data layer 208. According to embodiments, the read back signal is solved in seeking to identify the interference from the data layer 208.

The read back signal can be expressed as:

$$y(t)=a*\sin(\omega_1 t+\phi_1)+b*\sin(\omega_2 t+\phi_2)+i(t)+n(t) \quad (1)$$

where i(t) and n(t) stands for the data layer coupling response and noise respectively, and the amplitude of servo signal f1 and f2 can be expressed as a and b. For simplicity of expression, the noise component n(t) is ignored. The amplitude of the servo signal f1 can then be estimated as:

$$a_1 = \int_{t=0}^{T} y(t)*\sin(\omega_1 t)dt = \qquad (2)$$
$$a/2*\cos(\phi_1) + \int_{t=0}^{T} i(t)*\sin(\omega_1 t)dt = a/2*\cos(\phi_1) + \nabla a_1$$

$$a_2 = \int_{t=0}^{T} y(t)*\cos(\omega_1 t)dt = \qquad (3)$$
$$a/2*\sin(\phi_1) + \int_{t=0}^{T} i(t)*\cos(\omega_1 t)dt = a/2*\sin(\phi_1) + \nabla a_2$$

$$\hat{a} = \sqrt{(2a_1)^2 + (2a_2)^2} \qquad (4)$$

where a is a vector, and where $a_1$ and $a_2$ relate to the orthogonal components of a, and $\hat{a}$ is a unit vector of a. The amplitude of b can be expressed in the same way.

$\nabla a_1$ and $\nabla a_2$ relate to the interference caused by the data patterns written in the data layer in the reading of the servo pattern in the servo layer by the read/write head. In order to cancel the interference from the data layer, need to be estimated and stored on the recording medium for further retrieval when required. From equations (2) and (3), it can be observed that $$\nabla a_1 = \int_{t=0}^{T} i(t)*\sin(\omega_1 t)dt \text{ and } \nabla a_2 = \int_{t=0}^{T} i(t)*\cos(\omega_1 t)dt.$$

It is also observed that these interference parameters degrade servo performance.

According to embodiments, interference from the data layer, $\nabla a_1$ and $\nabla a_2$ can be calculated, and thereafter compensated in the servo loop. In calculating $\nabla a_1$ and $\nabla a_2$, to be identified. According to embodiments, the data coupling response i(t) can be modeled. Such model can be unique with respect to the type of read/write head and recording medium used, and can be formed with a real feedback signal from the hard disk drive. In embodiments, such a model can be formed through a data channel signal processing process. Such a process is carried out after the manufacturing of the HDD in an initialization of the HDD for operational use. Further, accuracy of such a model can be refined and trained further as the data channel signal processing process is periodically carried out during the life of the HDD. From such a data channel signal processing process, a channel response model can be formed.

As the exact data bit on the data layer for which to be reading or writing from is known, i(t) can then be estimated or identified based on the channel response model.

Further, it is noted that the data layer coupling interference value $\nabla a_1$ and $\nabla a_2$ is based on the frequency at which the servo pattern is written into the servo layer. In calculating $\nabla a_1$ and $\nabla a_2$, angular frequency $\omega_1=2\pi f_1$, and the function is integrated from where t=0 to T. T is the length of servo bursts that is used to calculate a single PES estimate.

It is noted that i(t) represents a data response signal which due to its random nature, contains components of frequency $\omega_1$ and $\omega_1$. Therefore its integration with $\sin(\omega_1 t)$ represents the amount of interference the data signal introduces to the PES calculation. It is also noted that the integration of the data channel coupling response with respect to time is one of a particular class of methods to determine the data channel coupling response. Other methods to obtain the response as a model can be applied.

After the data layer coupling interference values $\nabla a_1$ and $\nabla a_2$, as well as $\nabla b_1$ and $\nabla b_2$, are estimated or calculated, the values are thereafter written onto the recording medium. In embodiments, the interference values can be written onto the data layer. In embodiments, the interference values can be written onto a servo wedge in the data layer. It is noted, that for a dual frequency servo pattern, four values need to be stored. For a single frequency servo system, the number of interference points can be two (for a quadric servo pattern system), or one point (differential servo pattern, DC servo pattern, etc.).

According to embodiments, the data layer coupling interference value is calculated after the data pattern is written onto the data layer. The interference value is subsequently written onto the recording medium for later retrieval. In embodiments, the data layer coupling interference value is calculated when the data pattern is determined, and the interference value and the data pattern are contemporaneously written to the recording medium.

In carrying out a read operation or a write operation with the HDD, the read/write head obtains a read back signal from the recording medium in carrying out such a read operation or a write operation at a data location. A position error signal is desired from read back of the servo patterns, in determining the location of the read/write head with respect to the data recording track. The written data layer coupling interference value can then be extracted from the recording medium, the data layer coupling interference value having been pre-calculated, and with respect to the data pattern written at the data location.

In embodiments, the position error signal is determined by compensating the data layer coupling interference. For a dual frequency servo system, $$PES = \frac{a-b}{a+b}.$$

The compensated PES can be worked from Equations (2) to (4) above. Equations (2) and (3) can be rearranged to provide:

$$a_1 = \int_{t=0}^{T} y(t) * \sin(\omega_1 t) dt - \nabla a_1 \quad (6)$$

$$a_2 = \int_{t=0}^{T} y(t) * \cos(\omega_1 t) dt - \nabla a_2 \quad (7)$$

where $a_1$ is estimated based on where the integral value of $\int_{t=0}^{T} y(t) * \sin(\omega_1 t) dt$ is determined, followed by subtraction of $\nabla a_1$, and where $a_2$ is estimated based on where the integral value of $\int_{t=0}^{T} y(t) * \cos(\omega_1 t) dt$ is determined, followed by subtraction of $\nabla a_2$. Thereafter, the value a of the amplitude of the servo signal f1 can be estimated based on Equation (4).

After determination of the compensated PES, the read operation or the write operation is then carried out by the read/write head on the data layer. It is noted that interference from data signals written in the top-lying data layer has been compensated in the PES, which would allow for a more precise head to medium location.

In embodiments, the data layer coupling interference values can be updated, with respect to new data signals or patterns to be written on the data layer. In embodiments, the old interference values are extracted or read back and are used to cancel or compensate the interference from the corresponding data sector in determining PES. Thereafter a new data signal is to be written on the verified data sector. A new set of interference values is then estimated or calculated based on the new data signal, .before the writing of the new data signal on the data sector. The new interference values can then be updated. In embodiments, the new interference values are updated at any time before its corresponding data sector is read back. In embodiments, the new interference values are updated when the HDD is idle. In embodiments, the new interference values are written at about the same time the new data signal is written. The new interference values can be written slightly before or slightly after the new data signal is written.

Figure 3:
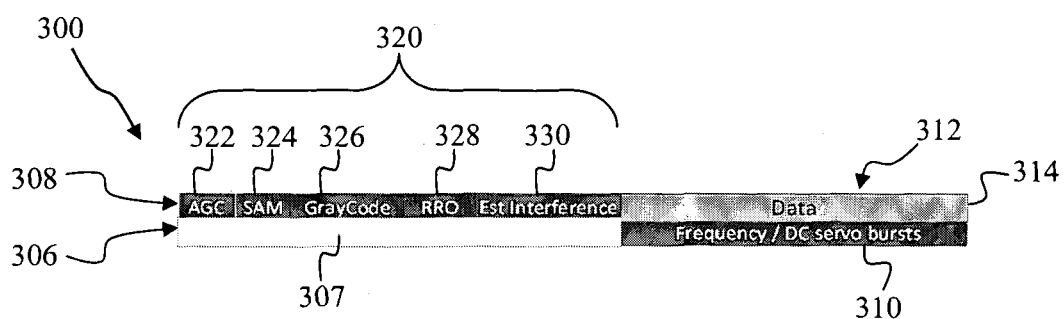
FIG. 3 illustrates a servo pattern layout of a buried servo system according to an embodiment.

FIG. 3 illustrates a servo pattern layout of a buried servo system according to an embodiment. In an embodiment, recording medium 301 can include a first layer 306 and a second layer 308. The first layer 306 can be a servo layer and the second layer 308 can be a data recording layer. The second layer 308 can be stacked over or on top of the first layer 306. The second layer can be of high linear density and can be arranged for writing user data on. The first layer 306 can be of low linear density and can be arranged for writing servo pattern information on. Servo information 310 can be arranged to be written in the servo layer 306. Such servo information can be in the form of servo signal bursts written at a predetermined frequency. Various forms of servo systems or servo configurations can be used, with the intention of refining head location precision.

The second layer 308, or data recording layer, can include portions for which data signals or patterns can be written on. Data patterns 312 can be written on the data recording layer 308. As mentioned, the data recording layer 308 can be a ferromagnetic layer, and can be magnetically manipulated by way of a read/write head 110. Data patterns 312 can be written on a data recording portion 314 of the data recording layer 308. Further, data recording layer 308 can also include a servo wedge 320, which can be used to store servo information, such as for example, servo addressing information. With respect to FIG. 2, a servo wedge 320 and a data portion 314 can be provided on data recording layer 108 of the recording medium 101. Multiple servo wedge portions 320 can be provided on the data recording layer. Servo wedge portions 320 need not form a chord across the data tracks 130 of the data recording layer, but can be provided at intermittent locations on each data track 130. Servo wedge portions 320 can be correlated to the beginning of the data portion sector 314. It is also noted that the area 307 in the servo layer 306, underneath the servo wedge portion 320, is deliberately left empty and without servo information. This is due to the importance of the addressing information being written into the servo wedge portion 320, and so as not subject such information to interference from the servo layer during the reading of the addressing information.

In an embodiment, servo wedge 320 can include servo addressing information. Information such as AGC 322, SAM 324 and GrayCode 326 can be written in various sectors provided in the servo wedge 320. Such information relates to addressing of the servo information and can be related to the subsequent corresponding data portion 312. In addition, the servo wedge 320 can include information pertaining to RRO 328, which can include reference to data induced interference which can behave like conventional RRO.

According to various embodiments, estimated interference 330, according to the present disclosure, can be stored in the servo wedge 320. Such estimated interference 330 can relate to a data layer coupling interference value as according to the present disclosure. The estimated interference 330 can relate to the interference which can be introduced by the data signal patterns 312 stored in the subsequent corresponding data portion 314. The estimated interference 330 can be calculated and written in the servo wedge either subsequent to or contemporaneously with the writing of the data patterns 312 onto the data layer 308.

In various embodiments, the estimated interference values are stored in non-volatile semiconductor memory, such as flash memory. Hybrid hard disk drives can be used, in which conventional recording medium is augmented with flash memory which can improve certain operations of the HDD. Such flash memory can be used to store addressing information. Access to the flash memory can also be much shorter than accessing normal recording medium, which can suffer from mechanical function latency, as well as rotational latency. According to embodiments, a data storage apparatus can include a recording medium. The recording medium can include a rotating disc with a data layer and a servo layer. The recording medium can also include a solid state semiconductor or flash memory coupled to the rotating disc.

FIG. 4 illustrates an experimentally obtained comparison between a HDD signal and a compensated signal. Plot 400 is provided, charting an experimental HDD signal 402. The experimental HDD signal 402 can be a spin stand signal, for which the recording medium and the read/write head are operated outside of a typical HDD enclosure, and on a spin stand setup. The spin stand can include an integrated control module to control the head and for reading/writing signals. The spin stand can provide experimental validation for HDD operation.

Estimated signal 404 is provided, which reflects the response after compensation of data layer coupling interference. The estimated signal 404 can be generated using the head response and the original information bits written in the data layer. Interference values are determined from the head response and information written, and then written onto the data layer. Subsequent read back extracts the written interference values for compensation from the read back signal. It can be observed that the estimated signal 404 matches up well with the experimental HDD signal 402. It is noted that the plot 400 compares the estimation of data layer induced interference and the true interference. It shows the accuracy of such estimates which can indicate that the cancellation scheme is practical. Interference extraction is not referred to in this plot.

FIG. 5A and FIG. 5B illustrate a comparison for interference components $\nabla a_1$ and $\nabla a_2$ respectively, estimated using average waveforms, and from a reader model. In FIG. 5A, graph 500 is provided, with plot 502 charting interference component $\nabla a_1$ determined or estimated from a plurality of waveforms obtained from multiple operational readings of the HDD, which are thereafter averaged. A spin stand can be used to run the HDD to obtain the multiple operational readings.

Plot 504 charts interference component $\nabla a_1$ determined or estimated based on the estimated signal i(t), which is generated using a trained head response. The head response is obtained from data channel processing in forming a model to determine such head response.

In FIG. 5B, graph 520 is provided, with plot 522 charting interference component $\nabla a_2$ determined or estimated from a plurality of waveforms obtained from multiple operational readings of the HDD, which are thereafter averaged. Plot 524 charts interference component $\nabla a_2$ determined or estimated based on the estimated signal i(t), which is generated using a trained head response. It can be observed for both plots 500, 520, that the estimated interference components 504, 524 matches well with the real interference components 502, 522.

Figure 6A:
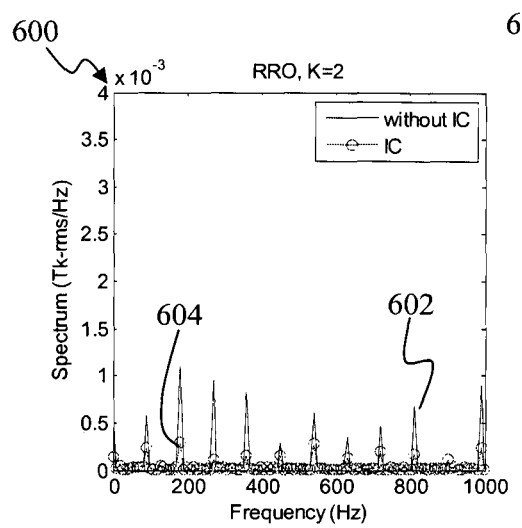
FIG. 6A and FIG. 6B illustrate a comparison of the RRO of the PES demodulation noise.
Figure 6B:
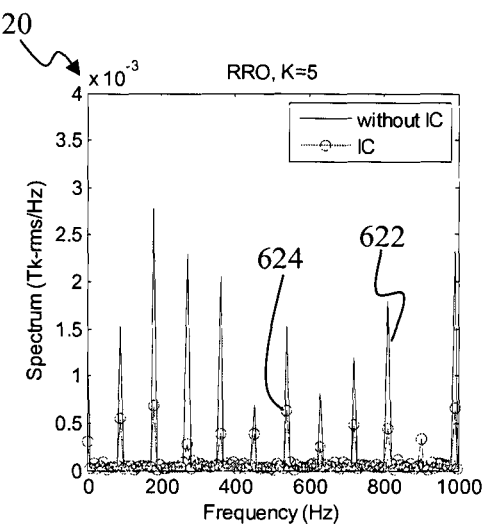

FIG. 6A and FIG. 6B illustrate a comparison of the RRO of the PES demodulation noise. FIG. 6A illustrates a comparison of the RRO of the PES demodulation noise with and without the interference cancellation of the present disclosure, and where the K-value is 2. K-value refers to the ratio of the amplitude of the signal from the data layer with respect to signal from the servo layer. In such a case, with a K-value of 2, it can be inferred that the amplitude of the data signal is about 2 times as strong as the amplitude of the servo signal. In the simulation, media noise and fly height variation effect are all included. Graph 600 is provided, with plot 602 charting the RRO as obtained from an uncompensated PES signal. It is noted that various harmonics can be observed in plot 602. Plot 604 charts the RRO as performance with the interference cancellation method of the present disclosure. A significant reduction in the amplitude of the harmonics can be observed.

FIG. 6B illustrates a comparison of the RRO of the PES demodulation noise with and without the interference cancellation of the present disclosure, and where the K-value is 5. Graph 620 is provided, with plot 622 charting the RRO as obtained from an uncompensated PES signal. Plot 624 charts the RRO as performance with the interference cancellation method of the present disclosure. As before, a significant reduction in the amplitude of the harmonics can be observed. It can also be observed that the proposed method can work effectively for both low K and high K.

Figure 7:
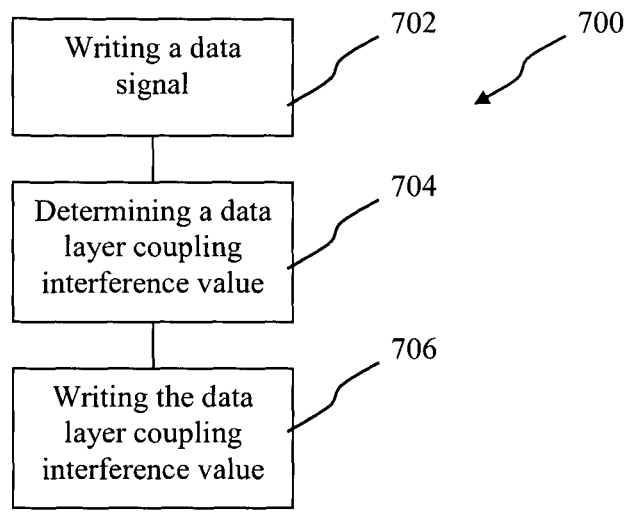
FIG. 7 illustrates a block diagram of a method according to an aspect of the present disclosure.

FIG. 7 illustrates a block diagram of a method 700 according to an aspect of the present disclosure. Method 700 can be a method of operating a data storage apparatus. The data storage apparatus can include a sensor head and a recording medium including a data layer and a servo layer provided under the data layer. In 702 the method can include writing a data signal into a portion of the data layer. In 704, the method can include determining a data layer coupling interference value arising due to interference from the data layer provided in between the sensor head and the servo layer in reading servo data, the data layer coupling interference value determined based on the data signal. In 706, the method can include writing the data layer coupling interference value onto the recording medium.

In an embodiment, the method includes determining the data layer coupling interference value based on a data layer coupling response.

In an embodiment, the method includes determining the data layer coupling interference value based on the data layer coupling response and a servo pattern on the servo layer.

In an embodiment, the method includes determining the data layer coupling interference value based on a frequency at which the servo pattern is written on the servo layer.

In an embodiment, the method includes identifying the data layer coupling response from a data channel response model.

In an embodiment, the method includes carrying out a data channel signal processing operation in determining the data channel response model.

In an embodiment, the method includes integrating the data channel coupling response with respect to time.

In an embodiment, the servo pattern is any one of a single frequency quadric pattern, a differential servo pattern, a dual frequency servo pattern, a triple frequency servo pattern, or a DC servo pattern.

In an embodiment, the data layer coupling interference value is written to the recording medium contemporaneous to writing the data signal into a portion of the data layer.

In an embodiment, the method includes writing the data layer coupling interference value to the data layer.

In an embodiment, the method includes writing the data layer coupling interference value to a servo wedge in the data layer.

In an embodiment, the recording medium includes a solid-state semiconductor memory, and the data layer coupling interference value is written on the solid-state semiconductor memory.

In an embodiment, the method includes carrying out any one of a read operation or a write operation with the sensor head and the recording medium.

In an embodiment, the method includes obtaining a read back signal from the recording medium in carrying out the any one of a read operation or a write operation.

In an embodiment, the method includes extracting the data layer coupling interference value from the recording medium.

In an embodiment, the method includes compensating the data layer coupling interference value in determining a position error signal from the read back signal.

In an embodiment, the method includes calculating a new data layer coupling interference value prior to writing a new data signal in a write operation.

In an embodiment, the method includes writing the new data layer coupling interference value into the data layer together with writing the new data pattern in the write operation.

Figure 8:
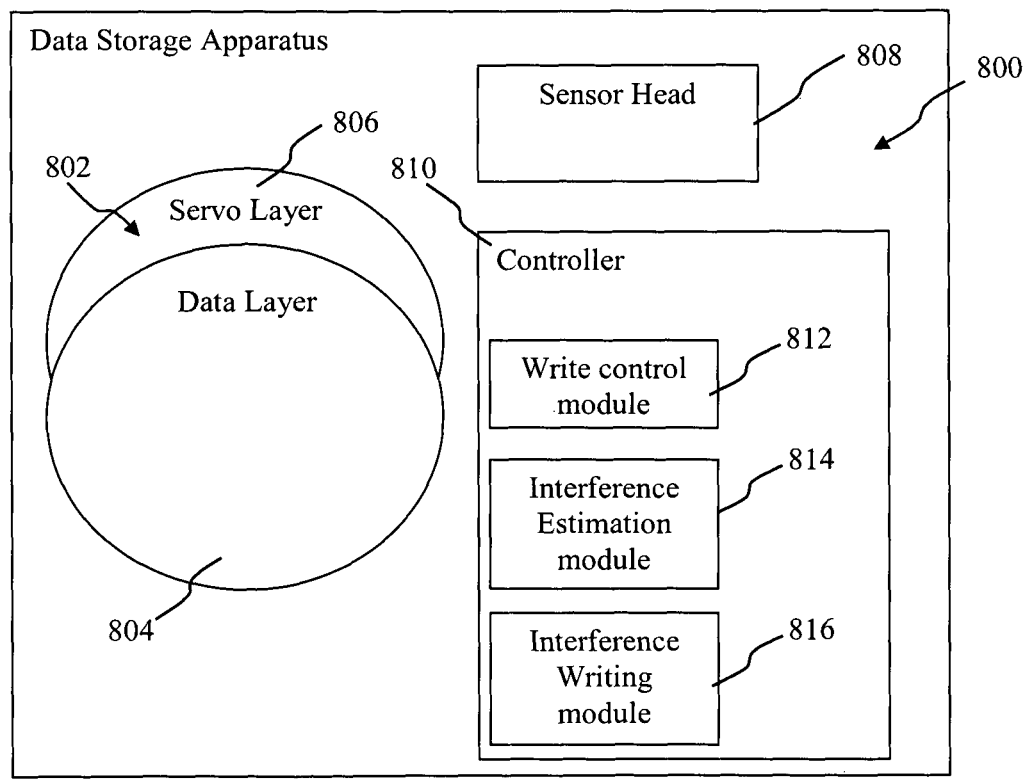
FIG. 8 illustrates a schematic of a data storage apparatus according to an aspect of the present disclosure.

FIG. 8 illustrates a schematic of a data storage apparatus 800 according to an aspect of the present disclosure. Data storage apparatus 800 can include a recording medium 802, the recording medium 802 including a data layer 804, and a servo layer 806 provided under the data layer 804. Data storage apparatus 800 can include a sensor head 808 for interacting with the recording medium 802.

Data storage apparatus 800 can include a controller 810 configured to send and receive signals with the sensor head 808 in carrying out any one of a read operation or a write operation with the sensor head 808 and the recording medium 802. Controller 810 can include a write control module 812 configured to provide signals to the sensor head 808 to write a data signal into a portion of the data layer 804. Controller 810 can also include an interference estimation module 814 configured to determine a data layer coupling interference value arising due to interference from the data layer 804 provided in between the sensor head 808 and the servo layer 806 in reading servo data, the data layer coupling interference value determined based on the data signal. Controller 810 can further include an interference writing module 816 configured to provide signals to the sensor head 808 to write the data layer coupling interference value onto the recording medium 802.

In an embodiment, the data layer coupling interference is determined based on a data layer coupling response.

In an embodiment, the data layer coupling interference value is determined based on the data layer coupling response and a servo pattern on the servo layer.

In an embodiment, the data layer coupling interference value is determined based on a frequency at which the servo pattern is written on the servo layer.

In an embodiment, controller further includes a data response model module configured to identify the data layer coupling response from a data channel response model.

In an embodiment, the controller further includes a data channel signal processing module configured to carry out a data channel signal processing operation in determining the data channel response model.

In an embodiment, the controller further includes an integration module configured to integrate the data channel coupling response with respect to time.

In an embodiment, the servo pattern is any one of a single frequency quadric pattern, a differential servo pattern, a dual frequency servo pattern, a triple frequency servo pattern, or a DC servo pattern.

In an embodiment, the data layer coupling interference is written to the data layer.

In an embodiment, the data layer coupling interference value is written to a servo wedge in the data layer.

In an embodiment, the recording medium includes a solid-state semiconductor memory, and the data layer coupling interference value is written on the solid-state semiconductor memory.

In an embodiment, the controller further includes a read back signal module configured to obtain a read back signal from the recording medium in carrying out the any one of a read operation or a write operation.

In an embodiment, the controller further includes an extraction module configured to extract the data layer coupling interference value from the recording medium.

In an embodiment, the controller further includes a compensation module configured to compensate the data layer coupling interference value in determining the position error signal from the read back signal.

According to various embodiments, there is provided at least one computer program product directly loaded into an internal memory of at least one digital computer provided in a data storage apparatus of the present disclosure. The computer program product can include software code portions for performing the steps of a method according to an embodiment of the present disclosure when the at least one product is run on the at least one digital computer. In embodiments, the internal memory can include a memory module which can include a non-transitory computer-readable storage medium.

In various embodiments, there is provided a controller for carrying out an operational function in the data storage apparatus, which can include, but not limited to, a data storage controller, a servo read back controller, a head positioning controller, a data read/write controller, etc. The controller can include a digital computer configured to receive a computer program product. In embodiments, several digital computers or microprocessors are synchronized and operate cooperatively as part of an overall system.

The above apparatus, method and/or system as described and illustrated in the corresponding figures, is not intended to limit an or any apparatus, method or system as according to an embodiment, and the scope of the present disclosure. The description further includes, either explicitly or implicitly, various features and advantages of the method or system according to the present disclosure, which can be encompassed within an apparatus, method or system according to the disclosure.

While embodiments of the disclosure have been particularly shown and described with reference to specific embodiments, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A method of operating a data storage apparatus, the data storage apparatus comprising a sensor head and a recording medium comprising a data layer and a servo layer provided under the data layer, the method comprising:
  writing a data signal into a portion of the data layer;
  reading a servo signal from the servo layer;
  determining a data layer coupling response in the servo signal;
  calculating, based on the data layer coupling response in the servo signal, a data coupling interference value due to interference from the data layer provided in between the sensor head and the servo layer in reading servo data; and
  writing the data layer coupling interference value into the recording medium.

2. The method according to claim 1, further comprising determining the data layer coupling interference value based on the data layer coupling response and a servo pattern on the servo layer.

3. The method according to claim 2, further comprising determining the data layer coupling interference value based on a frequency at which the servo pattern is written on the servo layer.

4. The method according to claim 2, further comprising identifying the data layer coupling response from a data channel response model.

5. The method according to claim 4, further comprising carrying out a data channel signal processing operation in determining the data channel response model.

6. The method according to claim 2, further comprising integrating the data layer coupling response with respect to time.

7. The method according to claim 2, wherein the servo pattern is any one of a single frequency quadric pattern, a differential servo pattern, a dual frequency servo pattern, a triple frequency servo pattern, or a direct current (DC) servo pattern.

8. The method according to claim 1, wherein the data layer coupling interference value is written to the recording medium contemporaneous to writing the data signal into a portion of the data layer.

9. The method according to claim 1, further comprising writing the data layer coupling interference value into the data layer.

10. The method according to claim 8, further comprising writing the data layer coupling interference value to a servo wedge in the data layer.

11. The method according to claim 1, wherein the recording medium comprises a solid-state semiconductor memory, and the data layer coupling interference value is written on the solid-state semiconductor memory.

12. The method according to claim 1, further comprising:
  carrying out any one of a read operation or a write operation with the sensor head and the recording medium;
  obtaining a read back signal from the recording medium in carrying out the any one of a read operation or a write operation;
  extracting the data layer coupling interference value from the recording medium; and
  compensating the data layer coupling interference value in determining a position error signal from the read back signal.

13. The method according to claim 12, further comprising calculating a new data layer coupling interference value prior to writing a new data signal in a write operation.

14. The method according to claim 13, further comprising writing the new data layer coupling interference value into the data layer together with writing the new data signal in the write operation.

15. A data storage apparatus, comprising:
  a recording medium comprising:
    a data layer, and
    a servo layer provided under the data layer;
  a sensor head for interacting with the recording medium; and
  a controller configured to send and receive signals with the sensor head in carrying out any one of a read operation or a write operation with the sensor head and the recording medium, the controller comprising:
    a write control module configured to provide signals to the sensor head to write a data signal into a portion of the data layer,
    an interference estimation module configured to read a servo signal from the servo layer, determine a data layer coupling response in the servo signal, and calculate, based on the data layer coupling response in the servo signal, a data layer coupling interference value, and
    an interference writing module configured to provide signals to the sensor head to write the data layer coupling interference value onto the recording medium.

16. The data storage apparatus according to claim 15, wherein the data layer coupling interference value is determined based on the data layer coupling response and a servo pattern on the servo layer.

17. The data storage apparatus according to claim 16, wherein the data layer coupling interference value is determined based on a frequency at which the servo pattern is written on the servo layer.

18. The data storage apparatus according to claim 15, wherein the controller further comprises a data response model module configured to identify the data layer coupling response from a data channel response model.

19. The data storage apparatus according to claim 18, wherein the controller further comprises a data channel signal processing module configured to carry out a data channel signal processing operation in determining the data channel response model.

20. The data storage apparatus to claim 15, wherein the controller further comprises an integration module configured to integrate the data layer coupling response with respect to time.

21. The data storage apparatus according to claim 16, wherein the servo pattern is any one of a single frequency quadric pattern, a differential servo pattern, a dual frequency servo pattern, a triple frequency servo pattern, or a DC servo pattern.

22. The data storage apparatus to claim 15, wherein the data layer coupling interference is written into the data layer.

23. The data storage apparatus according to claim 22, wherein the data layer coupling interference value is written to a servo wedge in the data layer.

24. The data storage apparatus according to claim 15, wherein the recording medium comprises a solid-state semiconductor memory, and the data layer coupling interference value is written on the solid-state semiconductor memory.

25. The data storage apparatus according to claim 15, wherein the controller further comprises:
  a read back signal module configured to obtain a read back signal from the recording medium in carrying out the any one of a read operation or a write operation;

an extraction module configured to extract the data layer coupling interference value from the recording medium; and
a compensation module configured to compensate the data layer coupling interference value in determining a position error signal from the read back signal.

* * * * *